(12) United States Patent
Slensker et al.

(10) Patent No.: US 11,783,337 B2
(45) Date of Patent: Oct. 10, 2023

(54) MOBILE APPLICATION-BASED ERROR REPORTING

(71) Applicant: Bank of America Corporation, Charlotte, NC (US)

(72) Inventors: Neal Aaron Slensker, Fort Mill, SC (US); Geoffrey George Aslaksen, Matthews, NC (US); Richard Martin Seymour Scot, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 24 days.

(21) Appl. No.: 17/032,289

(22) Filed: Sep. 25, 2020

(65) Prior Publication Data
US 2022/0101325 A1    Mar. 31, 2022

(51) Int. Cl.
*G06F 16/29*    (2019.01)
*G06Q 20/40*    (2012.01)
*G06F 9/54*    (2006.01)

(52) U.S. Cl.
CPC ......... *G06Q 20/4016* (2013.01); *G06F 9/547* (2013.01); *G06F 16/29* (2019.01)

(58) Field of Classification Search
CPC ....... G07F 19/209; H04L 51/20; G01S 13/46; H04W 4/029; H04W 4/33; G06Q 20/4016
See application file for complete search history.

(56) References Cited

U.S. PATENT DOCUMENTS

| | | | |
|---|---|---|---|
| 6,757,544 B2 | 6/2004 | Rangaranjan et al. | |
| 7,028,896 B2 | 4/2006 | Goldstein et al. | |
| 7,222,078 B2 | 5/2007 | Abelow | |
| 7,232,063 B2 | 6/2007 | Fandel et al. | |
| 7,992,777 B1 | 8/2011 | Block et al. | |
| 7,995,791 B2 | 8/2011 | Flook et al. | |
| 8,055,575 B2 | 11/2011 | Grody et al. | |
| 8,095,610 B2 | 1/2012 | Gould et al. | |
| 8,104,679 B2 | 1/2012 | Brown | |
| 8,332,765 B2 | 12/2012 | Ergan et al. | |

(Continued)

OTHER PUBLICATIONS

How to Spot and Avoid Card Skimmers https://ibankfmb.com/2018/06/how-to-spot-and-avoid-card-skimmers/ (Year: 2018).*

(Continued)

*Primary Examiner* — Calvin L Hewitt, II
*Assistant Examiner* — Amanulla Abdullaev

(57) ABSTRACT

An apparatus is configured to receive a complaint initiation signal that includes an indication that a card reader may be compromised, and initiation date and time of the complaint, and geolocation data related to the reporting party. The apparatus is further configured to identify a street address closest to the geolocation data in the complaint using a geolocation application programming interface and the set of geolocation data. The apparatus is also configured to determine that the identified street address is associated with an entity. The apparatus then calculates a confidence interval as to whether that entity is the type of entity that uses a card reader. The apparatus is further configured to determine that the confidence interval exceeds a threshold. The apparatus is also configured to determine an identifier of the entity. Further, the apparatus is configured to publish an alert to a data feed.

9 Claims, 5 Drawing Sheets

(56) References Cited

U.S. PATENT DOCUMENTS

| | | |
|---|---|---|
| 8,397,108 B1 | 3/2013 | Vannatter et al. |
| 8,583,723 B2 | 11/2013 | Stewart |
| 8,700,738 B2 | 4/2014 | Moore et al. |
| 8,707,276 B2 | 4/2014 | Hill et al. |
| 8,707,319 B2 | 4/2014 | Nguyen et al. |
| 8,777,104 B1* | 7/2014 | Brock ................ G06K 7/0095 |
| | | 235/438 |
| 8,832,858 B2 | 9/2014 | Hill et al. |
| 8,885,894 B2 | 11/2014 | Rowen et al. |
| 9,014,660 B2 | 4/2015 | Pahlevani |
| 9,075,716 B2 | 7/2015 | Dempski et al. |
| 9,678,986 B2* | 6/2017 | Hancock ............ G01C 21/3605 |
| 9,719,316 B2 | 8/2017 | Lemm |
| 9,767,422 B2 | 9/2017 | Ray et al. |
| 9,842,295 B2 | 12/2017 | Fisher, Jr. |
| 9,842,338 B1* | 12/2017 | Shukla ................ G06F 16/955 |
| 9,922,506 B2 | 3/2018 | Hodges et al. |
| 9,940,771 B2 | 4/2018 | Blower et al. |
| 9,946,711 B2 | 4/2018 | Reiter et al. |
| 10,074,230 B2 | 9/2018 | Blower et al. |
| 10,109,160 B1 | 10/2018 | Blower et al. |
| 10,127,554 B2 | 11/2018 | Russell et al. |
| 10,249,150 B1 | 4/2019 | Blower et al. |
| 10,313,635 B2 | 6/2019 | Paliga et al. |
| 10,332,360 B2 | 6/2019 | Ghafoor |
| 10,505,972 B2 | 12/2019 | Thomas et al. |
| 10,529,193 B2 | 1/2020 | Blower et al. |
| 10,777,047 B1* | 9/2020 | Hamchuck ......... G06K 9/00671 |
| 11,062,248 B1* | 7/2021 | Cuan .................... G07D 11/26 |
| 2005/0165675 A1 | 7/2005 | Fujita |
| 2007/0239648 A1* | 10/2007 | Thota .................... G06F 40/143 |
| | | 706/47 |
| 2014/0122340 A1 | 5/2014 | Flitcroft et al. |
| 2014/0351125 A1* | 11/2014 | Miller ................... G06Q 40/02 |
| | | 235/379 |
| 2016/0224938 A1* | 8/2016 | Shah ................... G06Q 10/083 |
| 2017/0171235 A1 | 6/2017 | Mulchandani et al. |
| 2017/0251347 A1* | 8/2017 | Mehta .................. H04W 76/50 |
| 2017/0316357 A1* | 11/2017 | Meganathan ........... H04L 67/52 |
| 2017/0346776 A1* | 11/2017 | Valla ...................... H04L 51/20 |
| 2018/0068007 A1 | 3/2018 | Ciliberti, III |
| 2018/0189773 A1 | 7/2018 | Tanaka |
| 2019/0108701 A1 | 4/2019 | Kerning et al. |
| 2019/0147447 A1 | 5/2019 | McIntyre |
| 2019/0362356 A1* | 11/2019 | Lacoss-Arnold ........................... G06Q 20/4016 |
| 2020/0019993 A1 | 1/2020 | Polo |
| 2020/0143500 A1* | 5/2020 | DeBeaune ........... G06Q 50/265 |
| 2020/0193436 A1 | 6/2020 | Matthews |

OTHER PUBLICATIONS

Thieves Get Craftier With Skimmers New 'shimmers' steal data from chip cards https://www.consumerreports.org/scams-fraud/thieves-get-craftier-with-skimmers-debit-cards-credit-cards/ (Year: 2018).*

Payment Card "Skimmers" https://www.stanag.org/pdf/skimmers.pdf (Year: 2017).*

Slensker, N. A. et al., "Mobile Application-Based Error Response," U.S. Appl. No. 17/032,361, filed Sep. 25, 2020, 35 pages.

* cited by examiner

MOBILE APPLICATION-BASED ERROR REPORTING

TECHNICAL FIELD

This disclosure relates generally to control systems and data reporting. More specifically, this disclosure relates to mobile application-based error reporting.

BACKGROUND

Card readers are data input devices that read data from a storage medium such as a card or fob. The data may be embedded in a barcode, magnetic strip, computer chip, or other medium. Such devices may be used in a variety of security applications. For example, access control card readers are used to limit access to physical locations. Generally located at a control point such as a locked door or gate, access control card readers may employ a magnetic stripe reader, a biometric reader, a barcode reader, or a proximity reader. Card readers are also used to handle electronic payments and data transfers. For example, automated teller machines use magnetic stripe readers or chip authenticators to allow individuals to withdraw funds from an account. Card readers are also used to perform transactions with merchants.

Card readers present an information security risk because they are often deployed in settings where the devices are unattended and vulnerable to tampering. One common scheme that malicious actors use to obtain personal information from card user's is skimming. Skimming devices may be attached to the internal wiring of a transaction device, such as a fuel pump, or they may be fit over the original card reader. These devices allow the original card reader to continue functioning while the skimming device collects data from input cards. The data collected by card skimmers may then be used to create duplicates of the cards, which in turn compromises the security of any system using the cards as means of restricting access to physical locations or electronic information.

Identification of card skimming devices and security breaches stemming from these devices is complicated because they do not alter the operation of the original card reader. While someone may eventually detect a breach in a system using card readers, the means of detecting such a breach—e.g., seeing an unauthorized individual visiting a restricted area or noticing errant charges to a credit card-do not reveal which card reader is compromised. Detection of compromised card readers is also hindered by their distribution across multiple networks. Different networks may use different card reader identifiers, and many entities operating such security networks may be reluctant to share certain usage statistics that might improve detection of compromised card readers.

SUMMARY OF THE DISCLOSURE

According to one embodiment, an apparatus for card reader error reporting includes a memory and a hardware processor. The memory is configured to store a geolocation application programming interface (API). The processor is configured to receive a complaint initiation signal. A complaint initiation signal includes an indication that a card reader may be compromised, and initiation date and time of the complaint, and geolocation data related to the reporting party. The processor is configured to identify a street address closest to the geolocation data in the complaint using the geolocation API and the set of geolocation data. The processor is further configured to determine that the identified street address is associated with an entity. The processor then calculates a confidence interval as to whether that entity is the type of entity that uses a card reader. The processor is also configured to determine that the confidence interval exceeds a threshold. The processor is configured to determine an identifier of the entity. Additionally, the processor is configured to publish an alert to a data feed. The alert includes an indication that the card reader may be compromised, the initiation date and time of the complaint, the street address that is associated with the entity, and the identifier of the identity.

Certain embodiments provide one or more technical advantages. As an example, an embodiment improves detection of compromised card readers in a network of card readers by collecting user reports of card readers that appear tampered. Additionally, some embodiments improve detection of compromised card readers by extracting geolocation data from images reported by users to determine the locations of tampered card readers. Further, some embodiments construct a data feed from the enriched data correlations related to the potentially tampered card readers. The disclosed embodiments also provide the capability of taking generalized security alerts regarding tampered card readers and evaluating the impact on a specific entity and users that interact with the entity.

The systems and methods described in this disclosure may be integrated into a practical application of a physical security system that employs card readers to control access to different rooms of a building. The disclosed system may be used to not only determine that one or more card readers may be compromised, but to also identify which card reader in the network is compromised and to initiate remedial steps to secure the network. Additionally, the disclosed system may be deployed in a network that processes credit card transactions. For example, the disclosed systems and methods may be used to identify automated teller machines that are compromised by the presence of a skimming device, alert institutions that may transact with the automated teller machine, as well as alert users of the automated teller machine. In both contexts the practical application of the disclosed systems and methods improves digital network security along with the physical security of the relevant locations.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings and detailed description, wherein like reference numerals represent like parts.

DETAILED DESCRIPTION

System Overview

Figure 1:
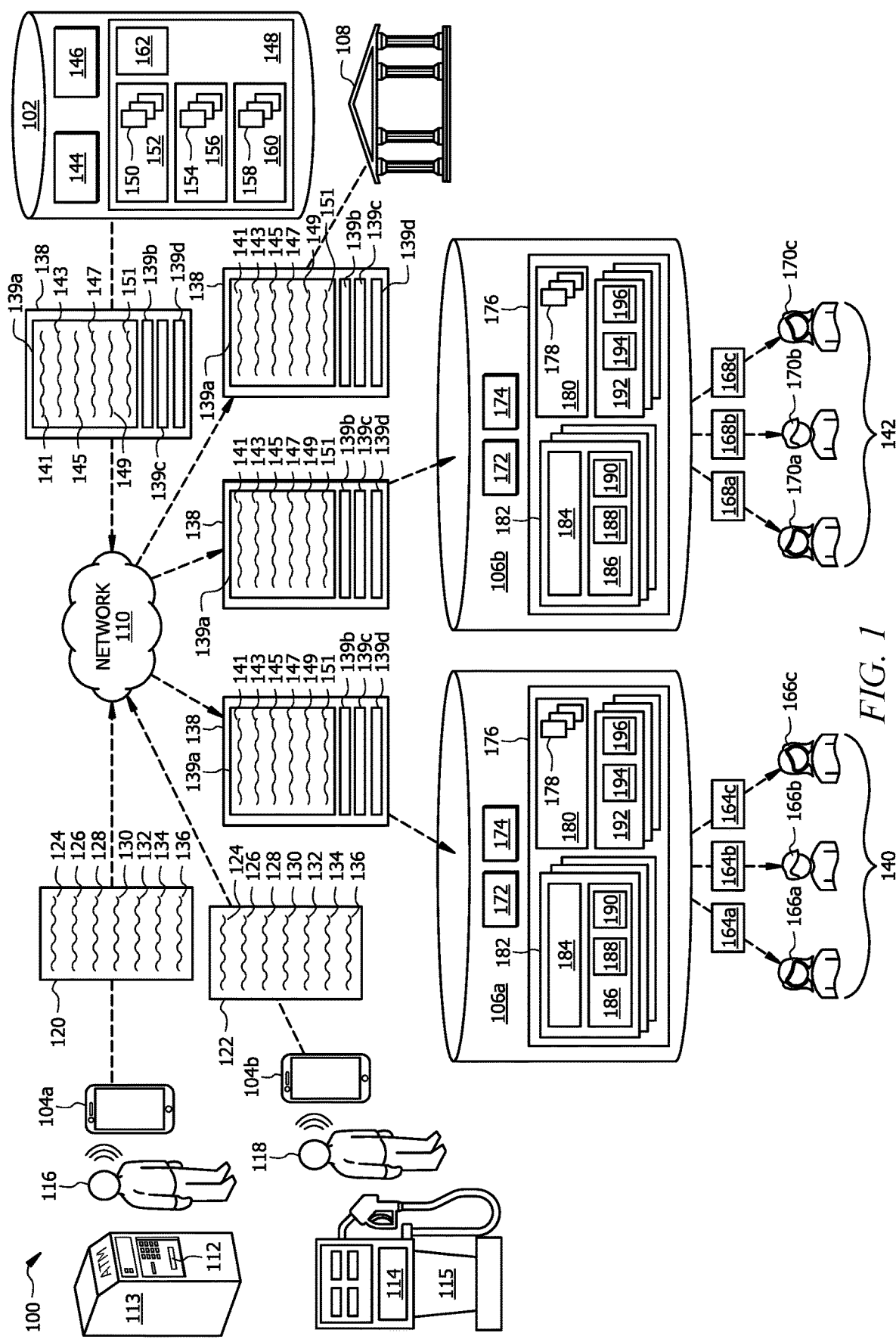
FIG. 1 is a schematic diagram of a system that is configured to receive and process mobile application-based error reports.

FIG. 1 is a schematic diagram of a reporting system 100 that is configured to receive and process mobile application-based error reports. The reporting system 100 is generally configured to receive complaints about potentially compromised card readers via a mobile application. In a practical application of the method performed by the reporting system 100, the security of physical locations secured by card reader systems is increased by rapid and accurate detection of card readers that may be compromised by the presence of skimmers or other forms of tampering. The security and reliability of electronic transactions involving credit or debit cards is also improved by such detection of compromised card readers.

In one embodiment, the reporting system 100 comprises a complaint aggregation server 102, one or more user devices 104, complaint analysis servers 106, and a security entity 108 (e.g., law enforcement agency). The complaint aggregation server 102, user devices 104, complaint analysis servers 106, and security entity 108 communicate through network 110. Network 110 facilitates communication between and amongst the various components of the reporting system 100. This disclosure contemplates network 110 being any suitable network operable to facilitate communication between the components of the reporting system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

User devices 104a and 104b are used by persons 116 and 118, respectively, to report issues with a card reader 112 located at an automated teller machine (ATM) 113 and card reader 114 located at a fuel pump 115. The card readers 112 and 114 are data input devices that can read data from a card storage medium. Card storage media includes any fob or device that contains a barcode, magnetic stripe, proximity reader (e.g., near field communication chip), or similar technology. For example, the card readers 112 and 114 may be configured to receive a credit card. While the card readers 112 and 114 are depicted as credit card terminals at points of sale, the present disclosure also contemplates application in other security contexts. For example, the methods disclosed can be used to identify security breaches in a secured facility that uses card readers to control access through doors and gates.

The devices 104 are generally any computing devices provide access to web applications. As such, a user device generally includes a user interface operable to display mobile applications. The user devices 104 also include mechanisms for the user to input information into a web application. For example, the user devices 104 may have a camera that can be used to take photographs or videos and transmit them over a wireless network. The user devices 104 also have keyboard or touchscreen inputs for users to input text. The user devices 104 may also have microphones for receiving audio input from a user.

The input data may then be incorporated into error reports 120 and 122. For example, the error reports 120 and 122 may contain a date and time 124 when the complaint was initiated, a user identifier 126 associated with the user generating the error report 120 or 122, a telephone number 128 associated with the user generating the error report 120 or 122, an email address 130 associated with the user generating the error report 120 or 122, geolocation data 132 collected from the user device 104 when the complaint was initiated, an IP address 134 associated with the user device 104, and a photograph 136 of the potentially compromised card reader 112 or 114. The error reports 120 and 122 are detailed further in FIG. 2. While the user devices 104a-b are illustrated as smart phones in the example reporting system 100, they may be personal digital assistants, laptops, tablet computers, personal computers, or any similar device capable of displaying an application to a user and receiving information from the user. Additional details about the role of user devices 104 is provided in FIGS. 2-4.

Complaint Aggregation Server

The error reports 120 and 122 are transmitted to a complaint aggregation server 102 via the network 110. Complaint aggregation server 102 is generally configured to analyze the incoming error reports 120 and 122 and publish a data feed 138 via network 110. The data feed 138 comprises a plurality of alerts 139. For example, the example data feed 138 includes alerts 139a, 139b, 139c, and 139d. Each of these alerts may related to a different card reader, or they may be reports related to the same card reader but submitted by different users. The data feed 138 is updated with information related to each received error report 120 or 122. The data feed 138 may be actively pushed to recipients—such as entity 140 that controls a complaint analysis server 106a, entity 142 that controls a complaint analysis server 106b, and security entity 108—or it may be located on a server accessible by other parties that may periodically download data from the data feed 138. The contents of the data feed 138, as well as the roles of the complaint analysis servers 106, entity 140, entity 142 and security entity 108, are further described below with relation to FIG. 5.

The example complaint aggregation server 102 illustrated in the reporting system 100 comprises a processor 144, a network interface 146, and a memory 148. The processor 144 comprises one or more processors operably coupled to the memory 148. The processor 144 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit or of any other suitable architecture. The processor 144 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 144 are configured to implement various instructions. For example, the one or more processors 144 are configured to execute one or more set of instructions 150 to implement a complaint enrichment module 152, one or more set of instructions 154 to implement a data feed module 156, and one or more set of instructions 158 to implement a mapping module 160. In this way, processor 144 may be a special purpose computer designed to implement the functions disclosed herein. In an embodiment, the complaint enrichment module 152, data feed module 156, and mapping module 160 are implemented using logic units, FPGAs, ASICs, DSPs, or any other suitable hardware. For example, the complaint enrichment module 152 may be configured to perform steps 202-212 of the method 200 described in FIG. 2. The data feed module 156 may be configured to perform step 214 of the method 200 described in FIG. 2 The mapping module 160 may be configured to generate the web map 402 illustrated in FIG. 4.

The network interface 146 is configured to enable wired and/or wireless communications. The network interface 146 is configured to communicate data between the complaint aggregation server 102 and other devices (e.g., user devices 104 and complaint analysis servers 106), systems, or domains. For example, the network interface 146 may comprise a WIFI interface, a LAN interface, a WAN interface, a modem, a switch, or a router. The processor 144 is configured to send and receive data using the network interface 146. The network interface 146 may be configured to use any suitable type of communication protocol as would be appreciated by one of ordinary skill in the art.

Memory 148 comprises one or more disks, tape drives, or solid-state drives, and may be used as an over-flow data storage device, to store programs when such programs are selected for execution, and to store instructions and data that are read during program execution. The memory 148 may be volatile or non-volatile and may comprise read-only memory (ROM), random-access memory (RAM), ternary content-addressable memory (TCAM), dynamic random-access memory (DRAM), and static random-access memory (SRAM).

The memory 148 is operable to store instructions 150 for implementing complaint enrichment module 152, instructions 154 for implementing data feed module 156, instructions 158 for implementing mapping module 160, and a geolocation application programming interface (API) 162. The operation of complaint enrichment module 152 is discussed in more detail in FIGS. 2-3. The operation of data feed module 156 is discussed in more detail in FIG. 2. The operation of mapping module 160 is discussed in more detail in FIG. 4. Geolocation API 162 is any extension or web application configured to return location coordinates based on data collected from a mobile phone (e.g., gps data, data based on interactions with cell towers and Wi-Fi nodes, etc.). The geolocation API 162 discussed in more detail in FIG. 2.

Complaint Analysis Servers

Complaint analysis servers 106a and 106b are capable of the same functionality. However, complaint analysis server 106a is controlled by entity 140 while complaint analysis server 106b is controlled by entity 142. Entities 140 and 142 represent any type of organization or group that uses card readers in some capacity. These may be businesses who use card readers in financial transactions or businesses that use card readers to physically secure an office building. These are offered as examples, but one of ordinary skill in the art will appreciate that various types of organizations can deploy card readers in a variety of security contexts.

A complaint analysis server 106 is generally configured to receive the data feed 138 via the network 110. It may then determine which of the data in the data feed 138 is relevant to the entity that operates it. The relevant data is then used to initiate workflow tickets that may be distributed to different groups within the entity. For example, the analysis server 106a may send a workflow ticket 164a to a response team 166a, a workflow ticket 164b to a response team 166b, and a workflow ticket 164c to a response team 166c. Similarly, the analysis server 106b may send a workflow ticket 168a to a response team 170a, a workflow ticket 168b to a response team 170b, and a workflow ticket 168c to a response team 170c. Additional details about these workflow tickets is included in the discussion of FIG. 2.

The example complaint analysis servers 106 illustrated in reporting system 100 comprise a processor 172, a network interface 174, and a memory 176. The processor 172 comprises one or more processors operably coupled to the memory 176. The processor 172 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit or of any other suitable architecture. The processor 172 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 172 are configured to implement various instructions. For example, the one or more processors 172 are configured to execute one or more set of instructions 178 to implement an analysis module 180. In this way, processor 172 may be a special purpose computer designed to implement the functions disclosed herein. In an embodiment, the analysis module 180 is implemented using logic units, FPGAs, ASICs, DSPs, or any other suitable hardware. For example, the analysis module 180 may be configured to perform the steps of method 500 described in FIG. 5.

The network interface 174 is configured to enable wired and/or wireless communications. The network interface 174 is configured to communicate data between the complaint analysis server 106 and other devices (e.g., complaint aggregation server 102), systems, or domains. For example, the network interface 174 may comprise a WIFI interface, a LAN interface, a WAN interface, a modem, a switch, or a router. The processor 172 is configured to send and receive data using the network interface 174. The network interface 174 may be configured to use any suitable type of communication protocol as would be appreciated by one of ordinary skill in the art.

Memory 176 comprises one or more disks, tape drives, or solid-state drives, and may be used as an over-flow data storage device, to store programs when such programs are selected for execution, and to store instructions and data that are read during program execution. The memory 176 may be volatile or non-volatile and may comprise read-only memory (ROM), random-access memory (RAM), ternary content-addressable memory (TCAM), dynamic random-access memory (DRAM), and static random-access memory (SRAM).

The memory 176 is operable to store instructions 178 for implementing analysis module 180; one or more card reader owner profiles 182, that each comprise a card reader owner identifier 184 and a list 186 of the card readers associated with that owner, including a location identifier 188 of where each card reader is located (e.g., gps coordinates) and a card reader identifier 190; and one or more user account profiles 192 that each comprise a user identifier 194 and a list 196 of card readers that have been used by the account. The operation of analysis module 180 as well as the roles of the card reader owner profiles 182 and user account profiles 192 are discussed in more detail in FIG. 5.

Operation of Complaint Aggregation Server

Figure 2:
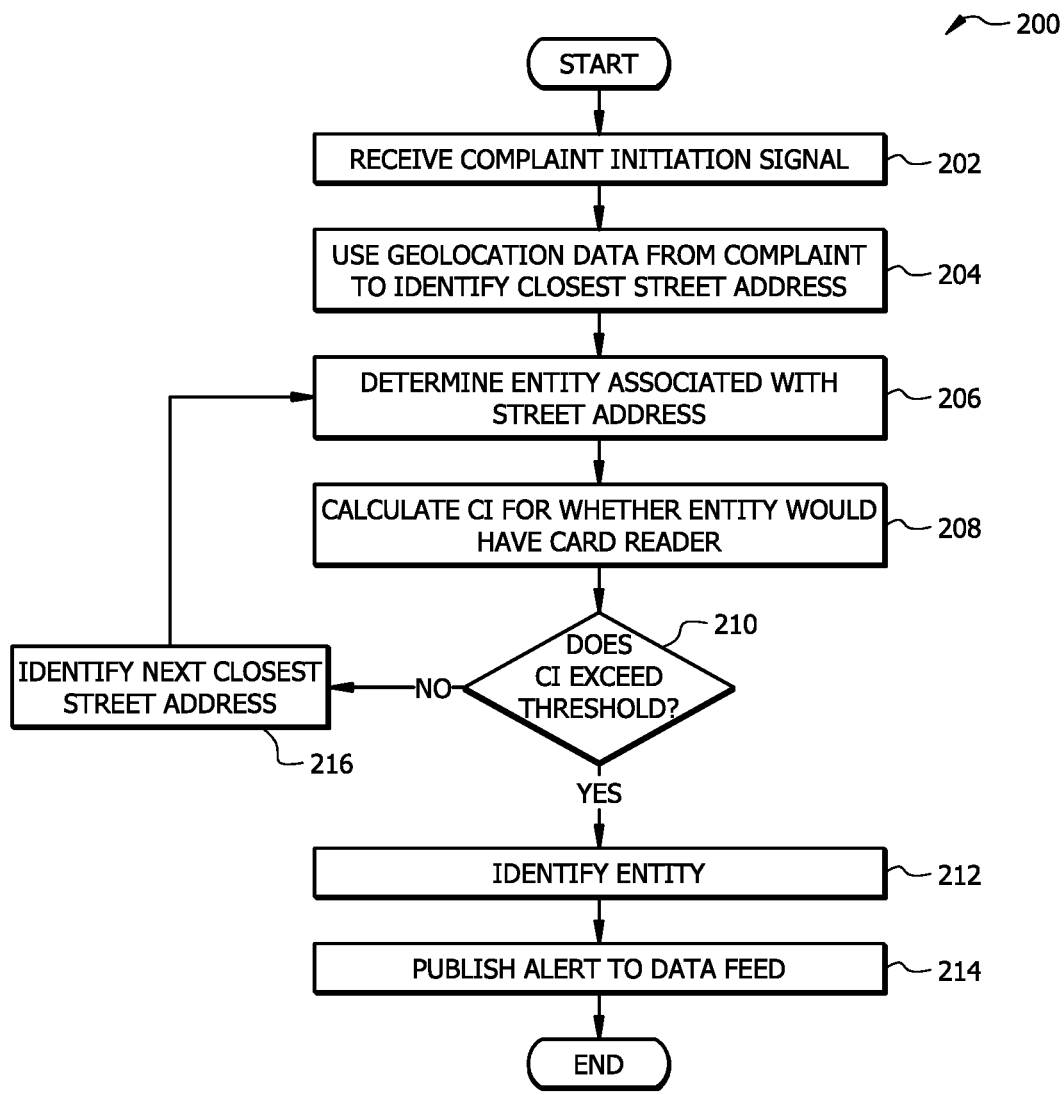
FIG. 2 is a flowchart of an embodiment of a method for card reader error reporting using the mobile application-based system.

FIG. 2 is a flowchart of an embodiment of a method 200 for card reader error reporting using the mobile application-based system. The method 200 begins at step 202 when the complaint aggregation server 102 receives a complaint initiation signal from the user 116. The complaint initiation signal is the error report 120 generated by the user 116 on the user device 104a. The error report 120 includes a date and time 124 when the complaint was initiated, a user identifier 126 associated with user 116, a telephone number 128 associated with user 116 (e.g., the telephone number of user device 104a), an email address 130 associated with user 116, geolocation data 132 collected from the user device 104a when the complaint was initiated, an IP address 134 associated with the user device 104a, and a photograph 136 of the potentially compromised card reader 112 taken on the user device 104a. This information included in the error report 120 is collected by the user device 104a. A mobile application installed in the user device 104a may be configured with input fields to allow the user 116 to manually enter some or all this information. The mobile application may also be configured to automatically gather such information automatically when the user 116 prompts the application to begin generating an error report 120.

Figure 3:
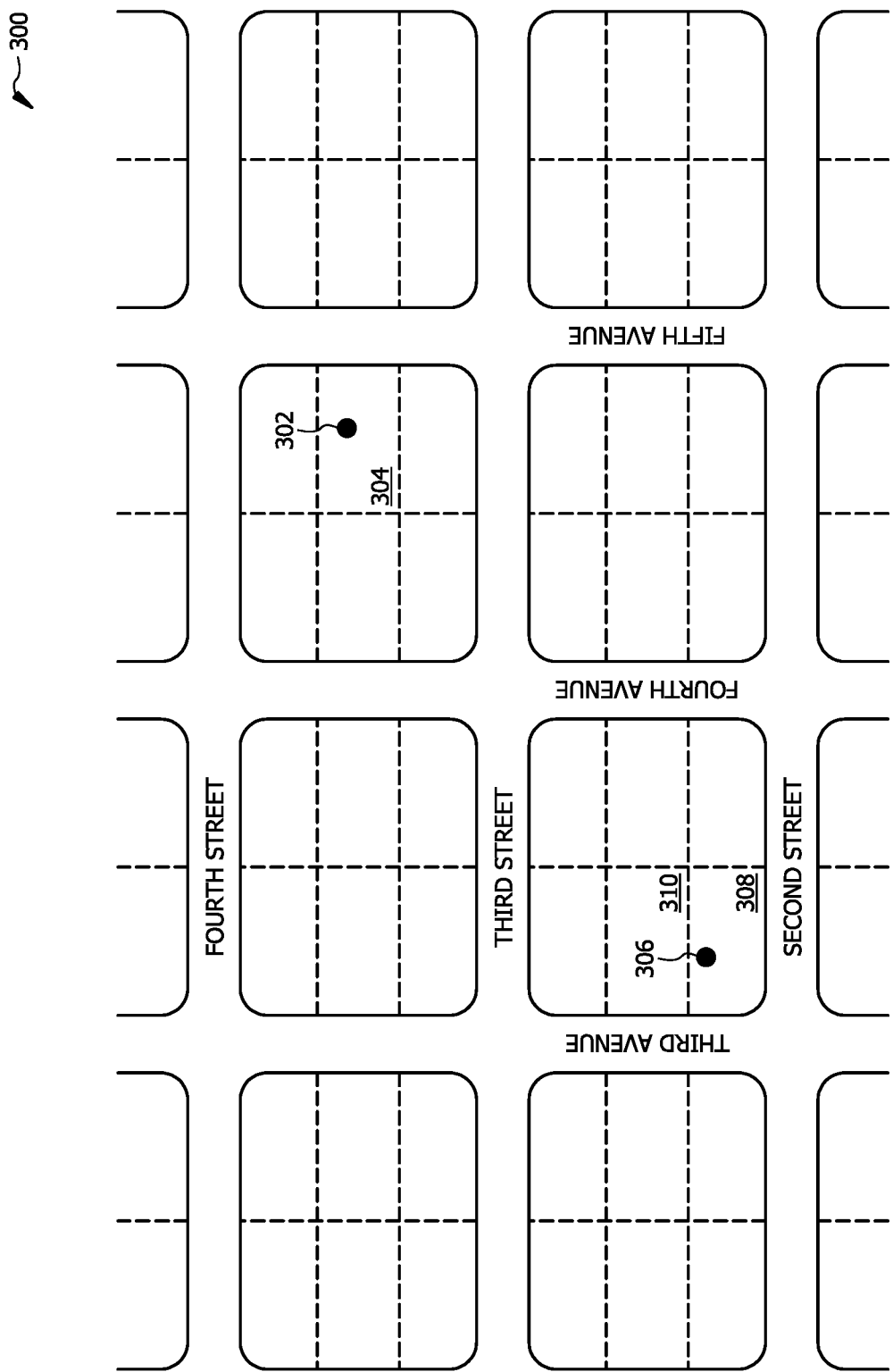
FIG. 3 illustrates the processing of geolocation data in an error reporting method.

Proceeding to step 204, the method continues by using the geolocation API 162 and the set of collected geolocation data 132 to identify a street address closest to the collected geolocation data 132. This process is illustrated in FIG. 3. The map 300 illustrates the processing of geolocation data in the error reporting method 200. When the collected geolocation data 132, represented by point 302, is input to the geolocation API 162, the geolocation API 162 returns address 304 as the nearest street address. Returning to FIG. 2, the method 200 proceeds to step 206 where the complaint aggregation server 102 determines that the street address 304 is associated with an entity. In this example, a bank with ATM 113. The method 200 then proceeds to step 208 where the complaint aggregation server 102 calculates a confidence for whether the entity is the type of entity that uses a card reader. Banks are likely to have a card reader on the premises, so a high confidence interval (e.g., 99%) will be assigned. In contrast, if the entity identified at step 206 were a private residence, then the confidence interval would be low. Proceeding to step 210, the complaint aggregation server 102 determines whether the confidence interval (in this case 99%) exceeds a threshold. In this example, the threshold is 90% confidence, and the method proceeds to step 212 because the threshold is exceeded. The operator of complaint aggregation server 102 may select this threshold.

At step 212, the complaint aggregation server 102 determines an identifier of the entity. The identifier may be a corporate name of the entity or an assumed business name. This is may be accomplished by searching a database of street addresses. Alternatively, this data may be collected from the geolocation API 162 when step 206 is completed.

Finally, the method 200 proceeds to step 214 where the complaint aggregation server 102 publishes an alert 139a to a data feed 138 accessible by entity 140, entity 142, and security entity 108. Each alert 139 comprises an indication 141 that the card reader may be compromised (i.e., tampered, altered with a skimming device, etc.); the initiation date and time of the complaint 143; the street address 145 that is associated with the entity; and the identifier 147 of the entity. The alert 139 may also comprise a user identifier 149 and geolocation data 151. The initiation date and time of the complaint 143 is the date and time 124 from the error report 120. The street address 145 is the address determined at step 204. The identifier 147 of the entity is the identifier determined at step 212. The user identifier 149 is the collected user identifier 126. The geolocation data 151 is the collected geolocation data 132.

In alternate embodiments, the complaint aggregation server 102 is configured to use an internet protocol (IP) address included in the error report 120 to determine the cellular carrier of the user 116. The IP address is associated with the user device 104. In such embodiments, the alert 139 issued at step 214 further comprises the internet protocol and an identifier of the cellular carrier.

In contrast, if the complaint aggregation server 102 determines at step 210 that the confidence interval does not exceed the threshold, then method 200 proceeds to step 216. For example, the complaint aggregation server 102 may receive a second error report 120, this time from user device 104b, that is related to the card reader 114 located at fuel pump 115. Performing the same steps 204-208 described above, the complaint aggregation server 102 uses the collected geolocation data 132 from this second error report 120, illustrated in FIG. 3 as point 306, to identify the nearest street address as street address 308. However, in this example the complaint aggregation server 102 determines at step 208 that the confidence interval for whether the entity associated with street address 308 is that type of entity that would have a card reader is 20%. Such a low confidence level may be due to determining that the street address 308 is zoned as a single-family residence. Because the confidence interval does not exceed the 90% confidence threshold, the method 200 proceeds to step 216. The complaint aggregation server 102 identifies the street address that is the next closest street address to the point 306 at step 216. In this example, that is street address 310. The method 200 then proceeds to progress through steps 206-210 again using the street address 310. If the confidence interval exceeds the threshold at step 210 the method 200 proceeds through steps 212 and 214 as described above. If the threshold is still not exceeded, then the method 200 progresses to step 216 until an address is identified for which the calculated confidence interval exceeds the threshold at step 210.

Figure 4:
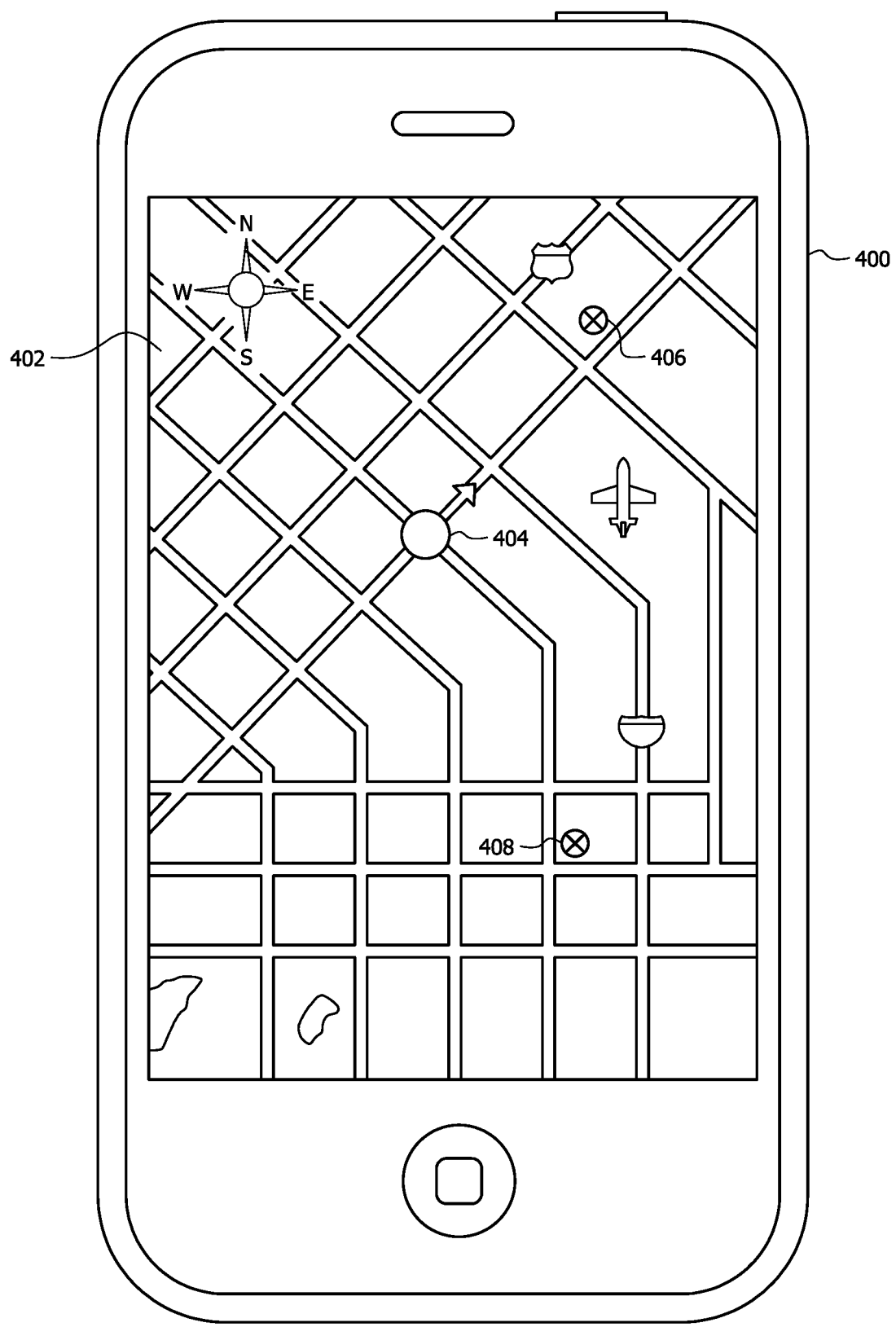
FIG. 4 illustrates an example web map that is generated in some embodiments of the mobile application-based system.

In addition to publishing alerts 139 to data feed 138, the complaint aggregation server 102 may be configured to maintain or update a web map as illustrated in FIG. 4. The web map 402 is accessible on user device 400. The user device 400 is another embodiment of the user devices 104 described in FIG. 1. The web map 402 may be an application installed on user device 400 or a page accessible through the internet. The web map 402 may show the user 404's current location in relation to sites where card readers were reported as compromised. Aggregation server 102 may update the web map 402 each time it issues an alert 139 to the data feed 138. In the example of FIG. 4, the web map was updated with a first marker 406 at the street address that is associated with a first entity identified using the method 200 and a second marker 408 at the street address that is associated with a second identity identified using the method 200. The marker 406 may comprise a link to a page that displays the number of alerts associated with that street address. The marker 408 may comprise a link to a page that displays the number of alerts associated that street address.

While the data used to generate the web map 402 is typically the data received in error report 120, the complaint aggregation server 102 may be configured to extract the necessary data from a photograph 136 of the potentially compromised card reader that is uploaded with an error report 120. For example, the complaint aggregation server 102 may receive a first error report 120 with an image of a first card reader and a second error report 120 with an image of a second card reader. The complaint aggregation server 102 may then extract from the metadata for the image of the first card reader a first set of global positioning system coordinates. The complaint aggregation server 102 may further extract from the metadata for the image of the second card reader a second set of global positioning system coordinates. It may then update the web map 402 by placing the marker 406 on the first set of global positioning system coordinates and by placing the marker 408 on the second set of global positioning system coordinates. As described above, these markers may provide a link to a list of card reader complaints at this address. Additionally, these markers may provide a link to a page that displays the details of the alert that led to the marker being updated on the web map 402.

Operation of Complaint Analysis Server

Figure 5:
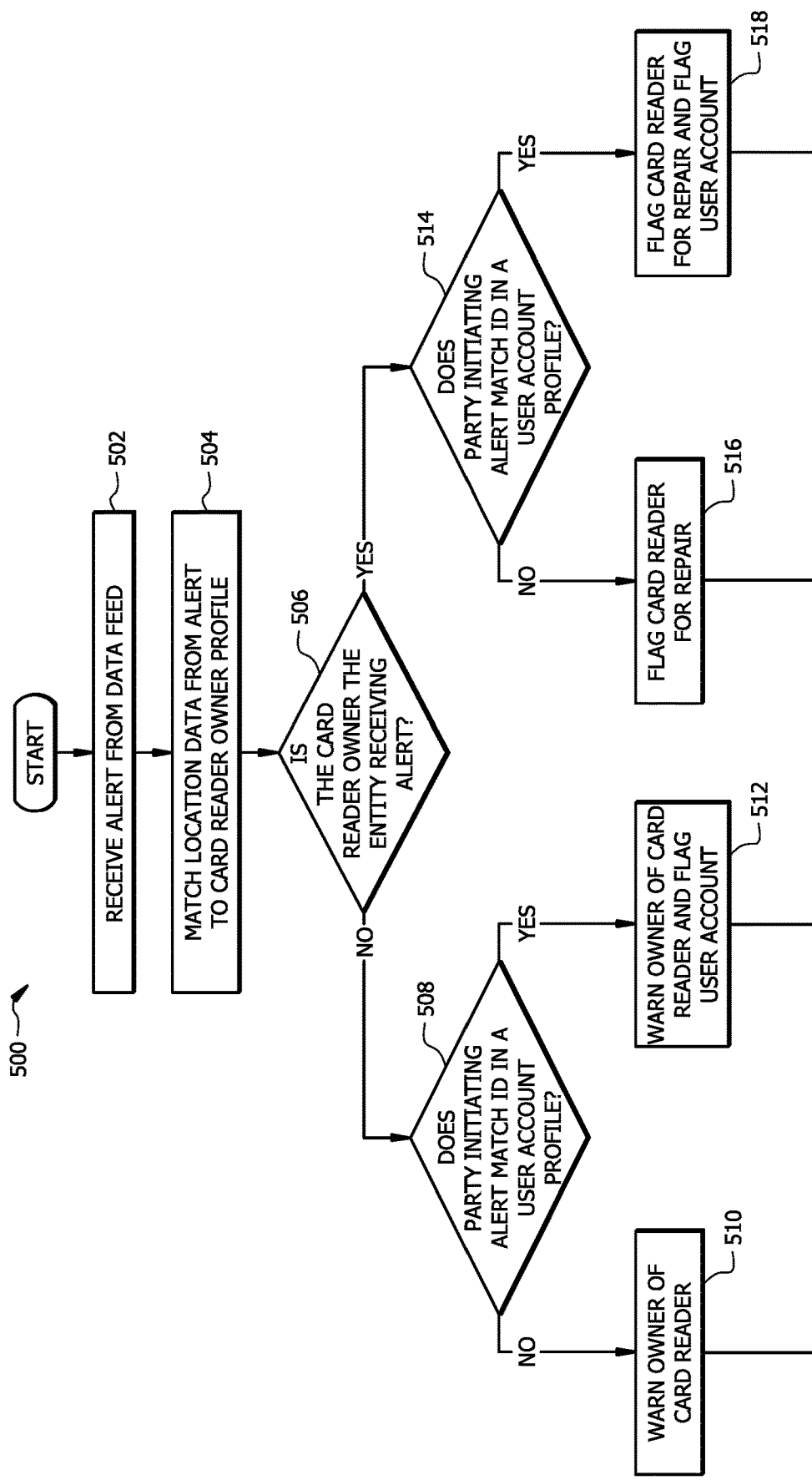
FIG. 5 is a flowchart of an embodiment of a method for handling card reader alerts.

FIG. 5 a flowchart of an embodiment of a method 500 for handling card reader alerts. The method 500 starts at step 502 when a complaint analysis 106 receives an alert 139 from the data feed 138. The following example of method 500 will focus on complaint analysis server 106a, but the operation is the same for complaint analysis server 106b. In this example, server 106a receives an alert 139a related to a card reader 112. The alert 139a comprises an indication 141 that the card reader may be compromised, the initiation date and time of the complaint 143; the street address 145 that is associated with the entity, the identifier 147 of the entity, a user identifier 149, and geolocation data 151.

At step 504, the complaint analysis server 106a determines that the geolocation data 151 of the card reader 112 matches a first location identifier 188 associated with a card reader owner profile 182. At step 506 the complaint analysis server 106a determines whether the owner of the card reader 112 is the entity receiving the alert 139. This determination is made based on the card reader owner identifier 184 associated with the card reader owner profile 182.

If it is determined that the owner of the card reader 112 is not the entity (e.g., entity 140) receiving the alert 139, then the method 500 proceeds to step 508. At step 508, the complaint analysis server 106a determines whether the party that initiated the alert 139 (e.g., user 116) has a user identifier 126 that matches an identifier 194 in a user account profile 192. If it is determined at step 508 that there is not a match between the identifier of the party that initiated the alert 139 (i.e., a user identifier 126) and one of the user identifiers in the plurality of user account profiles (i.e., one of the user identifiers 194 in the user account profiles 192), then the complaint analysis server 106a proceeds to step 510 where it transmits a message to the card reader owner identified (e.g., by card reader owner identifier 184) in the card reader owner profile (i.e., a card reader owner profile 182) indicating that the card reader associated with a card reader identifier (i.e., a card reader identifier 190) may be compromised. If, however, it is determined at step 508 that there is a match between the identifier of the party that initiated the alert 139 (i.e., a user identifier 126) and one of the user identifiers in the plurality of user account profiles (i.e., one of the user identifiers 194 in the user account profiles 192), then the complaint analysis server 106a proceeds to step 512 where it both transmits a message to the card reader owner identified (e.g., by card reader owner identifier 184) in the card reader owner profile (i.e., a card reader owner profile 182) indicating that the card reader associated with a second card reader identifier (i.e., a card reader identifier 190) may be compromised and flags the user account profile (i.e., a user account profile 192) for potential unauthorized use.

Returning to step 506, if it is determined that that the owner of the card reader 112 is the entity (e.g., entity 140) receiving the alert 139, then the method 500 proceeds to step 514. At step 514, the complaint analysis server 106a again determines whether the party that initiated the alert 139 whether the party that initiated the alert 139 (e.g., user 116) has a user identifier 126 that matches an identifier 194 in a user account profile 192. If it is determined at step 514 that there is not a match between the identifier of the party that initiated the alert 139 (i.e., a user identifier 126) and one of the user identifiers in the plurality of user account profiles (i.e., one of the user identifiers 194 in the user account profiles 192), then the complaint analysis server 106a proceeds to step 516 where it flags the card reader 112 with the location identifier 188 for repair. If, however, it is determined at step 514 that that there is a match between the identifier of the party that initiated the alert 139 (i.e., a user identifier 126) and one of the user identifiers in the plurality of user account profiles (i.e., one of the user identifiers 194 in the user account profiles 192), then the complaint analysis server 106a proceeds to step 518 where it both flags the card reader 112 with the location identifier 188 for repair and flags the user account profile (i.e., a user account profile 192) for potential unauthorized use.

Each of the steps 510-518 may be carried out directly by the analysis server 106a, or the analysis server 106a may generate workflow tickets 164 to send to a plurality of response teams 166 within the entity 140. For example, a response team 166a may be responsible for communicating warnings to card reader owners. A response team 166b may be responsible for communicating warnings to user account holders. A response team 166c may be responsible for handling actions related to cared readers owned or operated by the entity 140. A similar distribution of response teams is illustrated for entity 142, which has analogous response teams 170 that may receive workflow tickets 168.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for card reader error reporting, A server comprising:
   a processor;
   a mapping module for generating a web map; and
   a memory storing a geolocation application programming interface (API) and computer readable instructions that when executed by the processor, causes the processor to perform the steps of:
      publishing, via a network, a data feed to an analysis server;
      receiving, via the network, an error report from a user device, wherein the error report comprises:
         geolocation data,
         an image of a card reader,
         a date and time,
         a user identifier, and wherein the image of the card reader further comprises GPS coordinates of the card reader;
      executing the geolocation API;
      determining, via the executing geolocation API, an address based on the geolocation data;
      determining, based on the address, an entity, and a probability that the entity uses a card reader;
      based on the determined probability exceeding a threshold, determining an identifier of the entity, extracting from the image of the card reader the GPS coordinates and generating an alert comprising:
         the entity identifier, and
         the address, and from the error report:
         the date and time,
         the geolocation data, and
         the user identifier;
      updating the data feed with the alert;
      based on the updating of the data feed with the alert, and via the mapping module, updating the web map by adding a marker to the web map corresponding to the extracted GPS coordinates; and
      displaying, via the mapping module, the updated web map, including displaying the added marker on the updated web map, on a display of the user device.

2. The server of claim 1, wherein
   the added marker comprises a link to a page comprising a plurality of alerts associated with the street address that is associated with the entity.

3. The server of claim 1, wherein:
   the error report from the user device further comprises an internet protocol address associated with the user device from which the error report originated; and
   the alert further comprises:
      the internet protocol address;
      and an identifier of a cellular carrier associated with the user device.

4. A method for error reporting, the method performed by a server comprising a processor and a memory storing a geolocation application program interface (API) and a mapping module for generating a web map, the method comprising:
   publishing, by the processor via a network, a data feed to an analysis server;
   receiving, by the processor via the network, an error report from a user device, wherein the error report comprises:
      geolocation data,
      an image of a card reader,
      a date and time,
      a user identifier, and wherein the image of the card reader further comprises GPS coordinates of the card reader;
   executing, by the processor, the geolocation API;
   determining, by the processor via the executing geolocation API, an address based on the geolocation data;
   determining, by the processor, based on the address, an entity, and a probability that the entity uses a card reader;
   determining, by the processor, that the probability exceeds a threshold;
   based on the probability exceeding the threshold, by the processor:
      determining an identifier of the entity,
      extracting from the image of the card reader, the GPS coordinates and generating an alert comprising:
         the entity identifier, and
         the address, and from the error report:
         the date and time,
         the geolocation data, and
         the user identifier;
   updating, by the processor, the data feed with the alert;
   based on the updating of the data feed with the alert, and updating, by the processor, via the mapping module, the web map by adding a marker to the web map corresponding to the extracted GPS coordinates; and
   displaying, by the processor via the mapping module, the updated web map, including displaying the added marker on the updated web map, on a display of the user device.

5. The method of claim 4, wherein the added marker comprises a link to a page comprising a plurality of alerts associated with the street address that is associated with the entity.

6. The method of claim 4, wherein:
   the error report from the user device further comprises an internet protocol address associated with the user device from which the error report originated; and
   the alert further comprises:
      the internet protocol address;
      and an identifier of a cellular carrier associated with the user device.

7. A non-transitory computer readable medium storing a geolocation application program interface (API), a mapping module for generating a web map, and computer-readable instructions that when executed by a processor causes the processor to perform steps of:
   publishing, via a network, a data feed to an analysis server;
   receiving, via the network, an error report from a user device, wherein the error report comprises:
      geolocation data,
      an image of a card reader, a date and time,
a user identifier, and wherein the image of the card reader further comprises GPS coordinates of the card reader;
executing the geolocation API;
determining, via the executing geolocation API, an address based on the geolocation data;
determining, based on the address, an entity, and a probability that the entity uses a card reader;
based on the determined probability exceeding a threshold, determining an identifier of the entity, extracting from the image of the card reader the GPS coordinates and generating an alert comprising:
the entity identifier, and
the address, and from the error report:
the date and time,
the geolocation data, and
the user identifier;
updating the data feed with the alert;
based on the updating of the data feed with the alert, and via the mapping module, updating the web map by adding a marker to the web map corresponding to the extracted GPS coordinates; and
displaying, via the mapping module, the updated web map, including displaying the added marker on the updated web map, on a display of the user device.

8. The non-transitory computer readable medium of claim 7, wherein
the added marker comprises a link to a page comprising a plurality of alerts associated with the street address that is associated with the entity.

9. The non-transitory computer readable medium of claim 7, wherein:
the error report from the user device further comprises an internet protocol address associated with the user device from which the error report originated; and
the alert further comprises:
the internet protocol address;
and an identifier of a cellular carrier associated with the user device.

* * * * *